April 9, 1963 A. F. HULVERSON 3,084,371
WINDSHIELD CLEANING SYSTEM
Filed June 19, 1961 3 Sheets-Sheet 2

INVENTOR.
Adrian F. Hulverson
BY
W. E. Finkem
HIS ATTORNEY

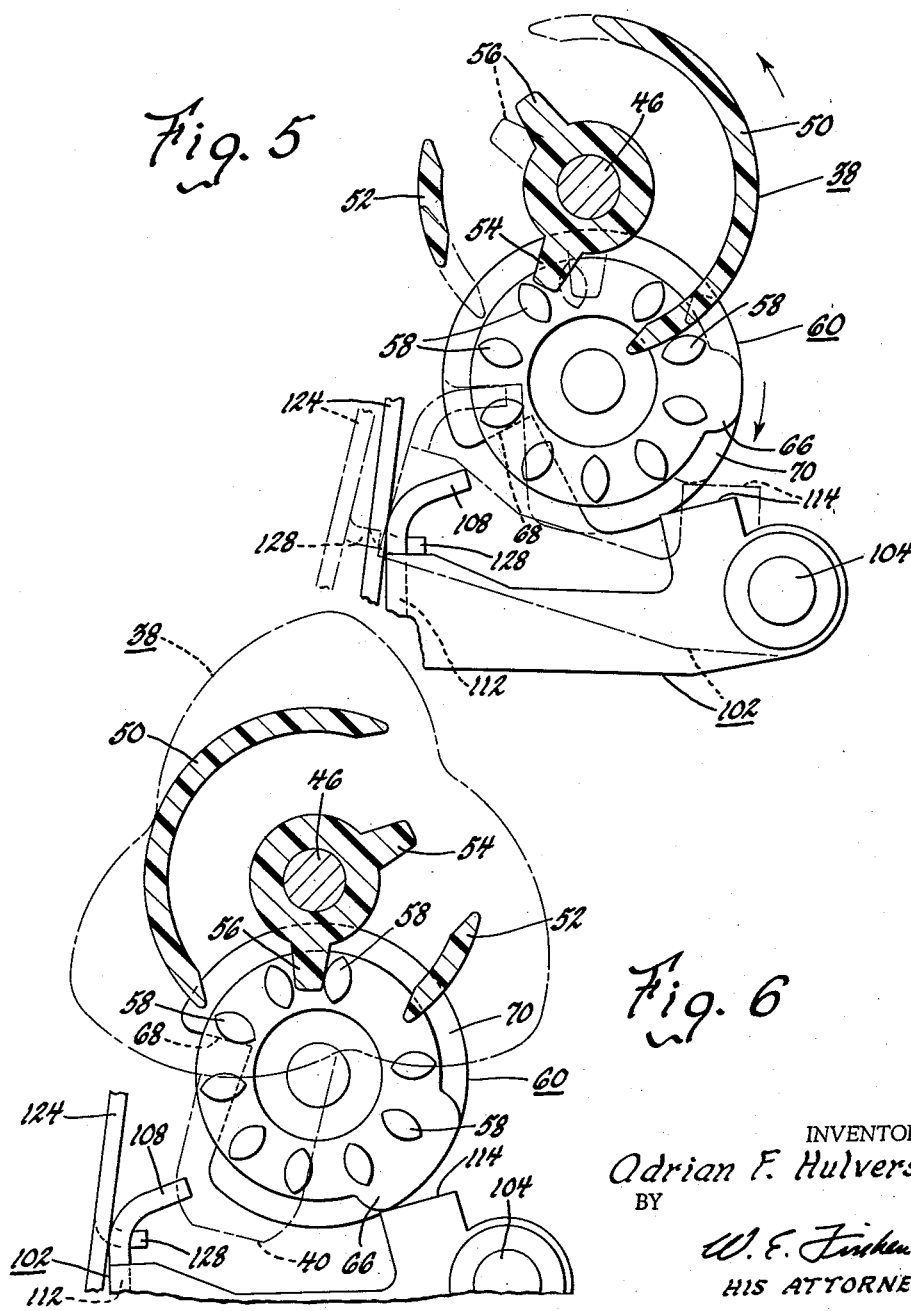

United States Patent Office 3,084,371
Patented Apr. 9, 1963

3,084,371
WINDSHIELD CLEANING SYSTEM
Adrian F. Hulverson, Drayton Plains, Mich., assignor to General Motors Corporation, Detroit, Mich., a corporation of Delaware
Filed June 19, 1961, Ser. No. 117,879
15 Claims. (Cl. 15—250.02)

This invention pertains to a system for cleaning vehicle windshields, and particularly to an improved washer unit designed for conjoint operation with a wiper unit.

Heretofore, windshield cleaning systems have been manufactured including an electric motor driven wiper unit and a washer unit adapted for conjoint operation with the wiper unit and having an interruptible driving connection therewith. A system of this type wherein conjoint operation of the wiper unit and the washer unit is initiated manually, wherein the washer unit operates to deliver intermittent pulses of liquid solvent onto the windshield for a predetermined number of strokes of the wiper unit and is thereafter automatically arrested, and wherein the wiper unit operates until it is manually shut off is disclosed in Ziegler Patent 2,905,962. This invention relates to an improved washer unit adapted for use in a system of the aforesaid type, wherein the washer unit can be operated through two cycles of operation by either maintaining the washer control depressed for a predetermined interval at the start of the first cycle or reactuating the washer control at any time during the first washing cycle.

Accordingly, among my objects are the provision of an improved motor driven intermittent squirt type washer pump; the further provision of a windshield cleaning system including means for effecting conjoint operation of a wiper unit and a washer unit including means for effecting a second automatic cleaning cycle at any time during the first cleaning cycle; and the still further provision of improved timing means for controlling the period of operation of a washer unit in a windshield cleaning system wherein the washer unit has an interruptible driving connection with the wiper unit.

The aforementioned and other objects are accomplished in the present invention by utilizing a ratchet cam assembly as the timing element including means for effecting movement of the timing element independently of the wiper unit. Specifically, the improved windshield cleaning system, as herein disclosed, comprises a unidirectional electric motor drivingly connected through a suitable gear reduction unit to a rotary crank. The rotary crank is connected by conventional linkage means to a pair of oscillatable wiper blades movable across the outer surface of a vehicle windshield. The gear reduction unit includes a power takeoff for rotating a cam, constituting part of the washer unit, in unison with the rotary crank.

The washer unit drive cam is formed wtih integral driving teeth and timing sectors which coact with a ratchet cam assembly constituting a timing element for the washer unit. The ratchet cam assembly is formed with a lockout cam which is engageable with the pump rod for maintaining the pump rod disengaged from the driving cam thus interrupting the driving connection between the wiper motor and the washer pump. The pump rod is connected to a flexible bellows, or bulb, which is spring actuated to effect the delivery stroke of the pump.

The ratchet cam has a plurality of circumferentially spaced pins on one face thereof, adjacent end pins being spaced apart throughout an angular distance twice that of the other pins so that in a predetermined position of the ratchet cam assembly rotation of the driving cam will not impart movement to the ratchet cam. A spring biased pawl controlled by an electromagnet is employed to impart initial movement to the ratchet cam to initiate a cycle of conjoint operation. The pawl is normally held in a latched position by the armature of the electromagnet, and when the electromagnet is energized the pawl is released to impart starting movement to the ratchet cam.

The control system for the windshield cleaning system includes a manual switch for the wiper unit and a push button switch for the washer unit, there being a one-way mechanical driving connection between the washer switch and the wiper switch of the type shown in the aforementioned Ziegler patent, such that the wiper unit is energized simultaneously with the washer unit to effect a conjoint cycle of operation. The washer switch controls energization of the electromagnet and is normally only momentarily depressed and thereafter released to initiate a single cycle of conjoint operation. The washer unit will then be operated for a predetermined number of wiper unit strokes, after which it will be automatically arrested. However, if the washer unit switch is maintained closed at the start of the cycle for a predetermined interval the pawl will not be relatched by the armature and accordingly the washer unit will operate through two cycles.

A second cycle can also be automatically effected if the washer control is depressed at any time during the first cycle. The wiper unit continues to operate until the manual control is returned to the "off" position.

Further objects and advantages of the present invention will be apparent from the following description, reference being had to the accompanying drawings wherein a preferred embodiment of the present invention is clearly shown and wherein similar numerals depict similar parts throughout the several views.

In the drawings:

FIGURE 4 is a fragmentary view, partly in section and partly in elevation, taken along line 4—4 of FIGURE 3.

FIGURE 5 is an enlarged fragmentary view taken along line 5—5 of FIGURE 3 with the parts being shown in the "off" position in full lines and in the "on" position in phantom lines.

FIGURE 6 is a view similar to FIGURE 5 depicting the manner in which the timing element is actuated by the driving cam during operation, with the cam being shown in phantom.

FIGURE 7 is an electrical schematic depicting the energizing circuit for the wiper unit and the washer unit.

Figure 1:
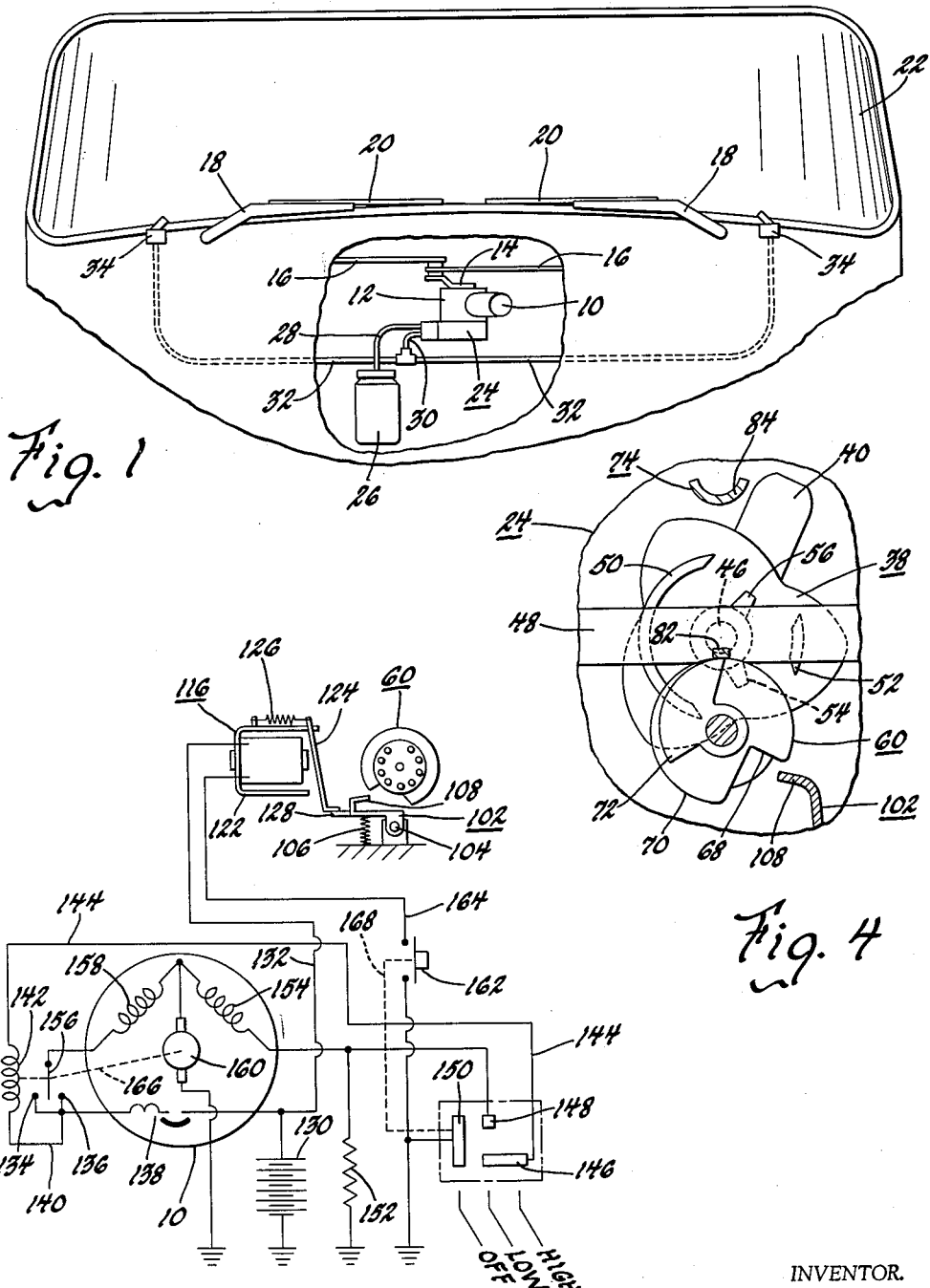
FIGURE 1 is a fragmentary view with certain parts broken away showing a portion of the vehicle equipped with the windshield cleaning system of this invention.

With reference to FIGURE 1, the windshield cleaning system of this invention includes a wiper unit comprising a unidirectional electric motor 10 coupled through a gear reduction unit 12 to a rotary crank 14. The rotary crank 14 is connected to a pair of spaced pivot shafts, not shown, through linkage means including drive links 16 to which wiper arms 18 carrying wiper blades 20 are connected. During rotation of the crank 14 the wiper blades 20 are oscillated in phase opposition across the outer surface of a windshield 22.

The washer unit of the improved windshield cleaning system includes a washer pump 24 attached to the housing of the gear reduction unit 12 and having an interruptible driving connection with the crank 14 so as to be driven in unison therewith. The washer pump 24 is of the intermittent squirt type and draws fluid from a reservoir 26 through a conduit 28 and delivers the same through conduits 30 and 32 to a pair of spaced nozzles 34 which direct the liquid solvent onto predesignated areas of the windshield 22 into the paths of the wiper blades 20.

Figures 2, 3:
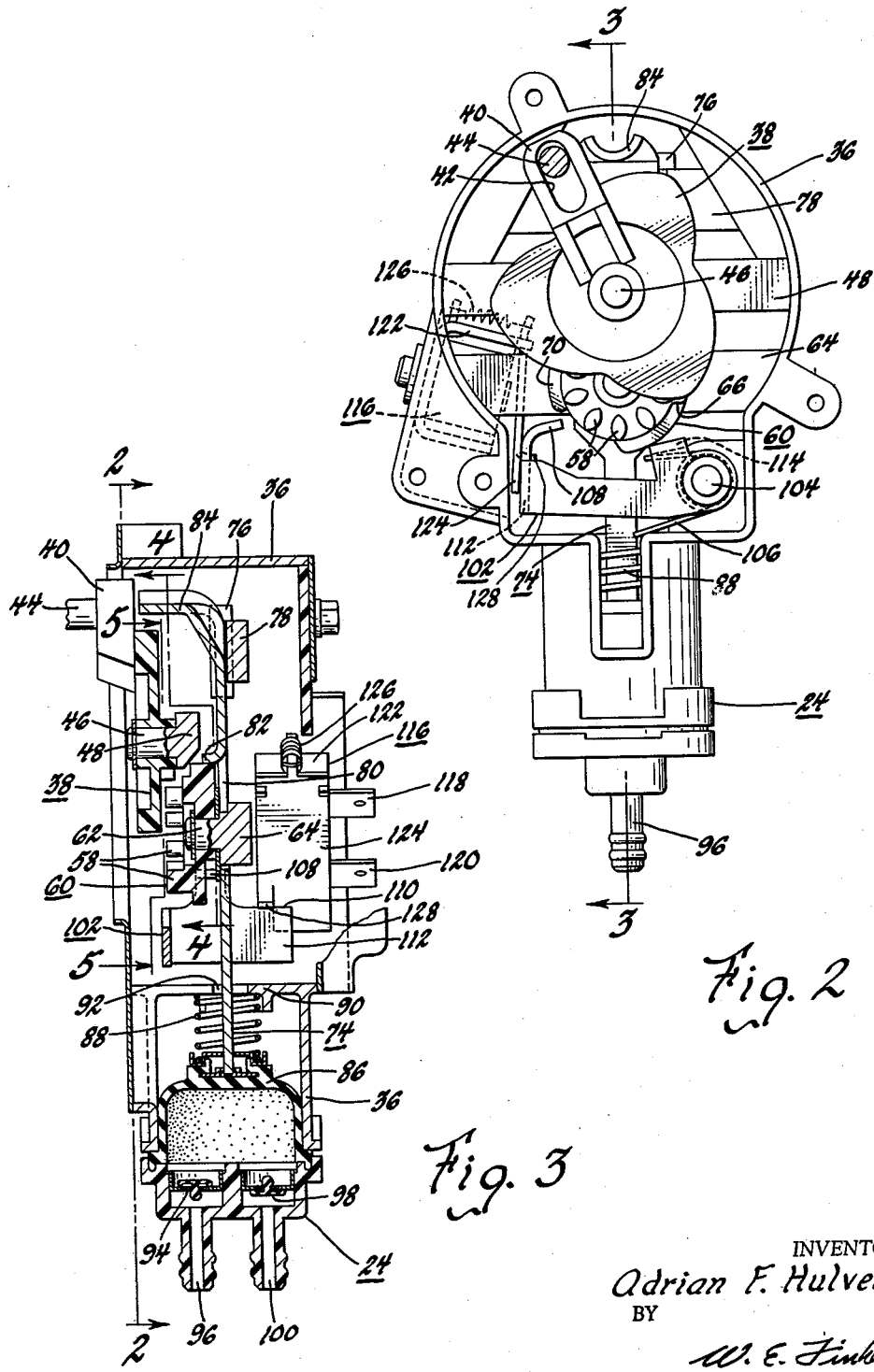
FIGURE 2 is a view in elevation of the improved washer unit.
FIGURE 3 is a longitudinal sectional view with certain parts broken away, taken along line 3—3 of FIGURE 2.

With reference to FIGURE 2, the washer pump 24 is contained within a housing 36 which may be bolted to the housing of the gear reduction unit 12. The washer pump 24 includes a three-lobe drive cam 38 having a radial arm 40 with an elongated slot 42 for receiving a drive pin 44 driven from the gear reduction unit 12 of the motor 10 in unison with the crank 14. Thus, during each revolution of the crank 14, the cam 38 is likewise rotated through a complete revolution.

As seen particularly in FIGURE 3, the cam 38 is rotatably journalled on an upstanding stud 46 integral with a web 48 of the housing 36. As seen in FIGURE 4 the back side of the cam 38 is formed with a pair of arcuate timing sectors 50 and 52 of different angular extent, the timing sectors 50 and 52 being coaxial with the axis of the cam. In addition, the cam 38 is formed with a pair of circumferentially spaced radially projecting teeth 54 and 56 which are aligned with the spaces between the timing sectors 50 and 52. The timing sectors 50 and 52 and the teeth 54 and 56 coact with upstanding pins 58 on a ratchet cam assembly 60 which is journalled on a stud 62 integral with a web 64 of the housing 36.

As seen particularly in FIGURES 5 and 6, the ratchet cam 60 has nine upstanding pins 58, the pins 58 being spaced 36° apart with two adjacent end pins being spaced 72° apart, the purpose of which will be apparent hereinafter. The ratchet cam 60, in addition, is formed with a cam lug 66 spaced axially inward of the pins 58; a notch 68 spaced axially inward of the lug 66 and formed in a disc portion 70 having a radius equal to the radius of the lug 66; and a lockout cam 72 located adjacent the web 64 and having an arcuate angular extent of substantially 120°.

A reciprocable pump rod 74 is slidably supported on a nylon guide 76 attached to a housing web 78 and has an elongated slot 80 with an upstanding lug 82 in the medial portion thereof. The stud 62 for supporting the ratchet cam 60, or timing element, extends through the elongated slot 80 and the lug 82 is adapted to coact with the lockout cam 72. The upper end of the pump rod 64 is flanged to form a cam follower 84 engageable with the lobes on the drive cam 38. The lower end of the pump rod 74 is attached to an elastomeric bellows, or bulb, 86 constituting a liquid displacing member. A coil spring 88 is confined between the bellows 86 and a side wall 90 of the housing 36, the spring 88 acting to collapse the bulb 86. The pump rod 74 extends through an opening 92 in the side wall 90. The interior of the bellows 86 communicates with a one-way inlet check valve 94 associated with an inlet nipple 96 and a one-way check valve 98 associated with an outlet nipple 100.

A lever 102 is pivotally mounted on a pin 104 in the housing 36, the lever being biased in the clockwise direction about the pin 104 as viewed in FIGURE 2 by a torsion spring 106. The lever 102 has a drive pawl 108 and a latching surface 110 formed on a transverse web 112 on the lever 102. In addition, a lever 102 has an offset cam follower lug 114. An electromagnet 116 including a coil and a core is mounted in the housing 36, the ends of the coil being connected to a pair of terminals 118 and 120 as seen in FIGURE 3. The electromagnet is supported on a U-shaped base 122 upon which an armature 124 is pivotally supported, the armature 124 being biased away from the electromagnet by a spring 126. The armature 124 has an offset lug 128 constituting a latch engageable with the surface 110 of the lever 102 for maintaining the lever 102 in the position shown in FIGURE 2. When the electromagnet is energized, the armature 124 moves in the clockwise direction towards the electromagnet whereupon the lug 128 is disengaged from the surface 110 thereby permitting the spring 106 to move the lever 102 in the clockwise direction about the pivot 104.

With reference to FIGURE 7, the energizing circuit for the wiper unit and the washer unit includes a battery 130 having one terminal grounded and the other terminal connected to a wire 132. The wire 132 connects with a pair of stationary parking switch contacts 134 and 136 for the wiper motor and with one terminal of the electromagnet 116. A thermal overload circuit breaker 138 is connected between the battery 130 and the parking switch contacts 134 and 136. The parking switch contacts 134 and 136 are connected by a wire 140 to one end of a relay coil 142, the other end of which is connected by a wire 144 to a stationary contact 146 of the wiper control. The wiper control includes a second stationary contact 148 and a movable bridging contact 150 which is grounded. The stationary contact 148 is connected to a high speed resistor 152 and to one end of a shunt field winding 154 of the motor 10. The parking switch includes a movable contact 156 connected to one end of the series field winding 158, the junction between the series and shunt field windings being connected to the armature 160 of the motor.

The washer control comprises a push button switch 162 for completing a ground connection to wire 164 of the electromagnet 116. The electromagnet 116 is shown deenergized with its armature 124 latching the lever 102 so that the pawl 108 is disengaged from the ratchet cam timing element 60. The spring 106 is shown schematically in FIGURE 7 as is the spring 126.

To operate the wiper unit independently of the washer unit, the movable bridging contact 150 is moved to either the "low" or "high" speed positions. With the bridging contact 150 in the low speed position, contacts 146 and 148 are connected thereby completing an energizing circuit for the relay coil 142 from the battery through the overload switch 138, the wire 144 and the contacts 146 and 150. Energization of relay coil 142 will effect movement of the contact 156 into engagement with the contact 134 thereby energizing the motor 10 for low speed operation since the resistor 152 is short circuited. When the contact 150 is moved to the high speed position, the resistor 152 is connected in series with the shunt field winding 154 thereby decreasing the energization of the shunt field so as to increase the speed of rotation of the motor 10. When the bridging contact 150 is moved to the "off" position, the inherently biased contact 156 of the parking switch engages contact 136 to continue energization until the wiper blades arrive at their parked position whereat the contact 156 is moved to an intermediate position by a cam actuated linkage 166 thereby deenergizing the motor.

To initiate a conjoint cycle of washer-wiper operation when the wiper unit is deenergized, it is only necessary to momentarily depress the washer button 162 since the washer button 162 has a one-way driving connection 168 with the bridging contact 150 for moving it to the "low" speed position. The motor 10 will be energized in the manner aforedescribed and momentary closure of the washer button 162 will energize the electromagnet 116 thereby disengaging the latch 128 from the lever 102 and permitting the drive pawl 108 to impart movement to the timing element 60 as will be pointed out hereinafter.

Moreover, if the washer button 162 is maintained closed for a predetermined interval, the washer unit will automatically operate through two complete cycles, and similarly if the washer button 162 is depressed at any time during the first cycle of operation the washer will automatically be conditioned to operate through a second cycle of operation.

The washer unit is shown in the "off" position in FIGURES 2, 3 and 4. In the "off" position, the lug 82 on the pump rod 74 is engaged with the high point of the lockout cam 72 thereby maintaining the follower 84 in a position where it does not engage the lobes on the drive cam 38. It is pointed out that the cam 38 is driven in the counterclockwise direction, as viewed in FIGURE 2, whenever the wiper motor 10 is energized. When the washer unit is in the "off" position, the timing sectors 50 and 52, as seen in FIGURE 5, are aligned with spaces between the drive pins 58, and the double space between the adjacent end pins 58 is located to permit free movement of the drive teeth 54 and 56. Thus, during rotation of the cam 38 with the washer unit in the "off" position, no movement will be imparted to the ratchet cam timing element 60. Likewise, the pump bellows 86 will be charged with liquid solvent which will immediately be discharged onto the windshield when the lug 82 is disengaged from the lockout cam 72.

When the electromagnet 116 is energized, with the parts in the solid line positions of FIGURE 5, the armature 124 moves in a clockwise direction about its pivot thereby disengaging the latch 128 from the lever 102. The torsion spring 106 moves the lever 102 towards the ratchet cam 60 and the drive pawl 108 engages the notch 68 thereof. However, at this time a portion of the timing sector 50 is between two adjacent pins 58 on the ratchet cam and accordingly no movement will be imparted to the ratchet cam. Since the wiper motor is energized concurrently with the electromagnet 116, and since the cam 38 is thus rotated in the counterclockwise direction as viewed in FIGURE 5 to a position where the timing sector 50 is no longer disposed between the pins 58 as shown in phantom in FIGURE 5, the pawl 108 will impart a clockwise starting movement to the ratchet cam 60 throughout a distance slightly less than the space between adjacent pins 58, namely about 26° as shown in phantom in FIGURE 5. This movement is sufficient to enable the leading edge of timing sector 52 to engage the pin 58 to complete a 36° clockwise movement of the ratchet cam 60 so that drive tooth 56 will engage the end pin 58.

The initial movement of the ratchet cam 60 by the pawl 108 is sufficient to disengage the lug 82 of the pump rod from the lockout cam 72 and accordingly the follower 84 is moved into engagement with the drive cam 38 by the spring 88. However, since the follower 84 engages the high point of the cam lobe, liquid solvent will not be delivered until the cam 38 rotates to allow the spring 88 to collapse the bellows 86. During continued rotation of the drive cam 38 from the position of FIGURE 5 to the position of FIGURE 6, an intake stroke of the pump bellows will be completed and the ratchet cam 60 will be moved throughout a distance of one pin, at which time the cam lug 66 will engage the offset follower lug 114 on the lever 102 thereby pivoting the lever 102 in the counterclockwise direction so that the pawl 108 is disengaged from the notch 68 of the ratchet cam 60. If, at this time, the electromagnet 116 is deenergized, the latch 128 will reengage surface 110 and maintain the lever 102 in the position of FIGURE 2 during the remainder of the washing cycle. However, if the electromagnet 116 is energized throughout the period when the cam lug 66 engages the follower lug 114 on the lever 102, or if it is reenergized at any time thereafter, the lever 102 will be unlatched so that when the ratchet cam arrives at its "off" position the pawl 108 will again impart a starting movement to the ratchet cam 60 so as to initiate another cycle of washer unit operation.

The ratchet cam 60 constitutes a timing element, or stroke counting means, for controlling the duration of operation of the washer unit during each cycle of conjoint washer-wiper operation. In other words, during each revolution of the cam 38, the timing element 60 is driven through a distance of two pins 58, or 72°. Since the wiper blades complete two strokes in each revolution of the cam 38 whereas the washer pump completed three strokes, it is apparent that the washer pump will be operated for only a predetermined number of wiper unit strokes. In the particular embodiment disclosed, five complete revolutions of the cam 38 will return the timing element to its "off" position. However, the operation of the pump will be arrested prior to the return of the timing element to its "off" position since the lockout cam 72 reengages the lug 82 on the pump rod after the timing element has moved through approximately 240°. The timing sectors 50 and 52 are formed with beveled leading and trailing edges, as shown, to assure alignment of the drive pins 50 with the teeth 54 and 56, and in addition the timing sectors 52 and 54 perform the additional function of precluding both forward and reverse rotation of the ratchet cam timing element 60 when the drive teeth of the cam 38 are disengaged from the drive pins 58.

While the embodiment of the invention as herein disclosed constitutes a preferred form, it is to be understood that other forms might be adopted.

What is claimed is as follows:

1. A windshield cleaning system including, a wiper unit, a washer unit, manually actuated control means to initiate conjoint operation of the wiper unit and the washer unit, wiper unit stroke counting means for automatically arresting operation of the washer unit after a predetermined number of wiper unit strokes, and means whereby either initial prolonged manual actuation of said control means or subsequent actuation thereof at any time during the first cycle of conjoint operation conditions said washer unit to effect another cycle of conjoint operation after completion of said first cycle.

2. A windshield cleaning system including, a wiper unit, a washer unit, means to set both units in operation for conjoint operation, stroke counting means actuated during said conjoint operation for continuing operation of said washer unit for a predetermined number of strokes of said wiper unit and then automatically arresting said washer unit, and means to condition the system to effect a second cycle of conjoint operation at any time during the first cycle of conjoint operation, said second cycle beginning after completion of said first cycle.

3. A windshield cleaning system including, a wiper unit, a washer unit, means to set both units in operation for conjoint operation, stroke counting means actuated during said conjoint operation for continuing operation of said washer unit for a first predetermined number of strokes of said wiper unit and then automatically arresting said washer unit, said wiper unit continuing in operation after said washer unit is arrested, and means to condition the system to effect another cycle of conjoint operation at any time during the first cycle of conjoint operation, said second cycle beginning after said wiper unit has completed a second predetermined number of wiper strokes after said washer unit has been arrested during said first cycle.

4. A windshield cleaning system including, a wiper unit, a washer unit, a single motor operable to effect operation of both units, said motor having continuous driving connection with said wiper unit and an interruptible driving connection with said washer unit, manually actuated control means to set both units in operation for conjoint operation by activating said motor and establishing the driving connection between said motor and said washer unit, stroke counting means actuated during said conjoint operation for continuing operation of said washer unit for a predetermined number of strokes of said wiper unit and then automatically arresting said washer unit by interrupting the driving connection between said washer unit and said motor, and means to condition the systems to effect a second cycle of conjoint operation either by initial prolonged manual actuation of said control means or subsequent actuation of said control means at any time during the first cycle of conjoint operation, said second cycle beginning after completion of said first cycle.

5. The system set forth in claim 4 wherein said washer unit includes a pump having a reciprocable pump rod, wherein said motor is drivingly connected to a cam for rotating the same, said pump rod having a follower engageable with said cam, and wherein said stroke counting means comprises a ratchet cam assembly having a lockout cam portion engageable with said pump rod for interrupting the driving connection between said pump and said motor.

6. The system set forth in claim 5 wherein said ratchet cam assembly is driven in a step by step manner by said motor driven cam during conjoint operation of said wiper unit and said washer unit, wherein said washer unit includes a spring biased pawl for imparting initial starting movement to said ratchet cam to establish a driving connection between said motor driven cam and said ratchet cam assembly, wherein the means to condition the system to effect another cycle includes an electromagnet having an armature coacting with said pawl for permitting a second starting movement of said pawl to maintain the driving connection between said motor driven cam and said ratchet cam assembly after said first cycle has been completed.

7. A washer pump assembly for a vehicle windshield including, a wiper motor driven rotatable cam, a pump having a spring actuated delivery stroke, a reciprocable pump rod for effecting the intake stroke of said pump and engageable with said motor driven cam, a timing element having an interruptible driving connection with said motor driven rotable cam including means for interrupting the driving connection between said pump rod and said motor driven cam, a spring biased pawl for imparting initial starting movement to said timing element to establish the driving connections between said motor driven cam and said timing element and said pump rod, and an electromagnet which, when deenergized, latches said pawl in an inoperative position and, when energized, unlatches said pawl so as to enable said pawl to impart a starting movement to said timing element.

8. A washer pump assembly for a vehicle windshield including, a wiper motor driven rotatable cam, a pump having a spring actuated delivery stroke, a reciprocable pump rod engageable with said motor driven cam to effect the intake stroke of said pump, a timing element having an interruptible driving connection with said motor driven cam and including means for interrupting the driving connection between said motor driven cam and said pump rod, the driving connection between said timing element and said motor driven cam including at least one drive tooth on said motor driven cam and coacting pins on said timing element, a spring biased pawl engageable with said timing element for imparting an initial starting movement thereto to establish the driving connections between said motor driven cam and said timing element and said pump rod, and an electromagnet coacting with said pawl for controlling the operation thereof.

9. The washer pump assembly set forth in claim 8 wherein said electromagnet includes a movable armature having an offset lug engageable with said pawl for latching it in an inoperative position.

10. The washer pump assembly set forth in claim 8 wherein said timing element comprises a ratchet cam assembly having a plurality of equiangularly spaced pins thereon, adjacent end pins being spaced apart by twice said equiangular spacing and wherein said motor driven cam includes a pair of angularly spaced arcuate timing sectors and a pair of drive teeth disposed between timing sectors.

11. A washer pump assembly for a vehicle windshield including, a housing, a drive cam rotatably supported in said housing and having an interruptible driving connection with said drive cam, a pump disposed within said housing having a spring actuated delivery stroke, a reciprocable rod engageable with said cam for effecting the intake stroke of said pump, coacting means on said timing element and said pump rod for precluding reciprocation of said rod during rotation of said drive cam to arrest pump operation, a spring biased pawl engageable with said timing element for imparting a starting movement thereto so as to establish a driving connection between said drive cam and said timing element and concurrently disengage the coacting means on said timing element and said pump rod, and an electromagnetically operated latch for holding said pawl in an inoperative position whereby said driving connection between said drive cam and said timing element will be automatically interrupted at a predetermined angular position of said timing element.

12. A washer pump assembly for a vehicle windshield including, a housing, a drive cam rotatably journaled in said housing, a timing element rotatably journalled in said housing and having an interruptible driving connection with said drive cam, a pump having a spring actuated delivery stroke, a reciprocable rod engageable with said drive cam for effecting the intake stroke of said pump, coacting means on said pump rod and said timing element for holding said pump rod out of engagement with said drive cam when said timing element is in a predetermined angular position to arrest operation of said pump, a spring biased pivotally mounted lever in said housing having a pawl engageable with said timing element for imparting starting movement thereto so as to establish the driving connection between said drive cam and said timing element and concurrently disengage the coacting means on said timing element and said pump rod to permit operation of said pump during rotation of said drive cam, an electromagnet operated latch engageable with said lever, and coacting means on said timing element and said lever for reengaging the latch with the lever to hold the pawl in an inoperative position when the electromagnet is deenergized.

13. A washer pump assembly for a vehicle windshield including, a housing, a drive cam rotatably journalled in said housing having a pair of angularly spaced arcuate timing sectors and a pair of drive teeth disposed between said timing sectors, a timing element journalled in said housing having a plurality of equiangularly spaced upstanding pins with adjacent end pins being spaced apart by twice said equiangular spacing, a pump having a spring actuated delivery stroke, a reciprocable rod engageable with said drive cam for effecting the intake stroke of said pump, coacting means on said pump rod and said timing element for holding said pump rod out of engagement with said drive cam at a predetermined angular position of said timing element to arrest operation of said pump, spring biased pawl engageable with said timing element for imparting starting movement thereto so as to align one of said drive pins with one of said drive teeth to establish a driving connection between said drive cam and said timing element, and an electromagnetically operated latch engageable with said pawl for holding the same in an inoperative position so that the driving connection between said drive cam and said timing element will be automatically interrupted at said predetermined angular position of said timing element whereat said drive teeth are aligned with the space between said adjacent end pins on said timing element.

14. The washer pump assembly set forth in claim 13 wherein the coacting means on said timing element and said pump rod for arresting operation of said pump comprise a lockout cam on said timing element and a cam follower lug on said pump rod.

15. The washer pump assembly set forth in claim 13 wherein said pawl is integral with a pivotally mounted lever having an offset cam follower lug thereon, and wherein said timing element includes a cam surface engageable with said cam follower lug to disengage the pawl from the timing element and reengage said pawl with said latch.

References Cited in the file of this patent

UNITED STATES PATENTS

| | | |
|---|---|---|
| 2,925,618 | Ziegler | Feb. 23, 1960 |
| 2,959,803 | Ziegler | Nov. 15, 1960 |